(12) United States Patent
Li et al.

(10) Patent No.: US 10,496,371 B2
(45) Date of Patent: Dec. 3, 2019

(54) KEY-VALUE COMPACTION

(71) Applicant: Intel Corporation, Santa Clara, CA (US)

(72) Inventors: Peng Li, Hillsboro, OR (US); Jawad B. Khan, Cornelius, OR (US); Sanjeev Trika, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 219 days.

(21) Appl. No.: 15/636,974

(22) Filed: Jun. 29, 2017

(65) Prior Publication Data

US 2019/0004768 A1    Jan. 3, 2019

(51) Int. Cl.

| | | |
|---|---|---|
| *G06F 17/00* | (2019.01) | |
| *G06F 7/36* | (2006.01) | |
| *G06F 7/22* | (2006.01) | |
| *H04L 9/08* | (2006.01) | |
| *G06F 16/22* | (2019.01) | |

(Continued)

(52) U.S. Cl.
CPC .................. *G06F 7/36* (2013.01); *G06F 7/22* (2013.01); *G06F 7/24* (2013.01); *G06F 16/2246* (2019.01); *H04L 9/08* (2013.01); *G06F 16/901* (2019.01); *G06F 2207/224* (2013.01)

(58) Field of Classification Search
CPC .. G06F 16/951; G06F 16/9535; G06F 3/0619; G06F 3/067; G06F 16/2282; G06F 3/0482
USPC .......................................................... 707/704
See application file for complete search history.

(56) References Cited

U.S. PATENT DOCUMENTS

2018/0307711 A1* 10/2018 Kulkarni ............. G06F 16/2365

OTHER PUBLICATIONS

O'Neil, P., et.al: "The Log-Structured Merge-Tree (LSM-Tree)", Acta Informatica, vol. 33, Issue 4, Springer Berlin Heidelberg, Germany, Jun. 1996, 32 pages.

(Continued)

*Primary Examiner* — Truong V Vo
(74) *Attorney, Agent, or Firm* — Grossman, Tucker, Perreault & Pfleger, PLLC

(57) ABSTRACT

One embodiment provides a storage device. The storage device includes a storage I/O (input/output) logic and a storage device controller. The storage I/O logic is to couple the storage device to a host device, the storage I/O logic to receive a sort-merge command the host device. The a storage device controller is to identify a level N SSTable (sorted string table) file, a corresponding level N index file, a first level N+1 SSTable file and a corresponding first level N+1 index file, in response to the sort-merge command to be received from the host device. The storage device controller is further to perform a sort-merge of the level N SSTable file and the first level N+1 SSTable file to produce a first level N+1 output SSTable file and a first level N+1 output SSTable index file. The level N SSTable file includes at least one level N key-value (KV) pair. The level N+1 SSTable file includes at least one level N+1 key-value (KV) pair. The sort-merge command includes a level N SSTable file index, a value corresponding to a number of SSTable files included in level N+1 and a level N+1 start SSTable file index. The identifying is based, at least in part, on the level N SSTable file index and the level N+1 start SSTable file index.

24 Claims, 4 Drawing Sheets

(51) Int. Cl.
    *G06F 7/24*          (2006.01)
    *G06F 16/901*     (2019.01)

(56)               References Cited

OTHER PUBLICATIONS

U.S. Appl. No. 15/391,758, filed Dec. 27, 2016.
European Search Report received in European Application No. EP18174970, dated Sep. 5, 2018, 12 pages.
Zhang Zigang et al: "Pipelined Compaction 1-15 for the LSM-Tree", 2014 IEEE 28TH International Parallel and Distributed Processing Symposium, IEEE, May 19, 2014, pp. 777-786, XP032628939, ISSN: 1530-2075, DOI:10.1109/1 POPS.2014.85.
Lanyue Lu et al: "WiscKey", 1-15 ACM Transactions on Storage, Association for Computing Machinery, New York, NY, US, vol. 13, No. 1, Mar. 2, 2017, pp. 1-28, XP058317271, ISSN: 1553-3077, DOI: 10.1145/3033273.
Maysam Yabandeh: "RocksDB Basics", Dec. 31, 2016, XP055496788, retrieved from the Internet: URL https://web.archive.org/web/20161231233746/https://github.com/facebook/rocksdb/wiki/RocksDB-Basics [retrieved on Aug. 1, 2018].

\* cited by examiner

KEY-VALUE COMPACTION

FIELD

The present disclosure relates to compaction, in particular to, key-value compaction.

BACKGROUND

For Log-Structured Merge (LSM) tree based key-value data storage systems (e.g., RocksDB, LevelDB), data compaction consumes significant overhead in terms of input/output (I/O) operations and computation cycles. Data compaction typically involves loading two sorted files from a storage device into a host device, performing a merge operation (in the host device) that includes discarding any older duplicates, and saving the merged file to the storage device. Data compaction operations can consume more than 90% of processor, memory, and storage I/O resources.

BRIEF DESCRIPTION OF DRAWINGS

Features and advantages of the claimed subject matter will be apparent from the following detailed description of embodiments consistent therewith, which description should be considered with reference to the accompanying drawings, wherein:

Figure 1A:
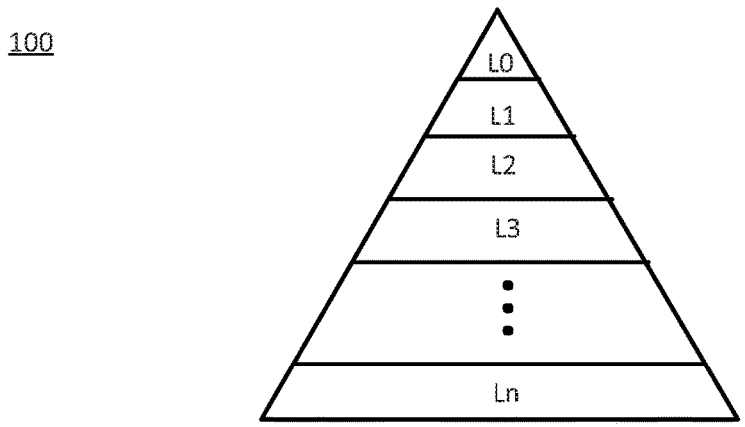
FIGS. 1A through 1C illustrate a structure and elements of a Log-Structured Merge (LSM) tree-based key-value storage system.

Although the following Detailed Description will proceed with reference being made to illustrative embodiments, many alternatives, modifications, and variations thereof will be apparent to those skilled in the art.

DETAILED DESCRIPTION

Generally, this disclosure relates to key-value compaction. An apparatus, method and/or system are configured to offload at least some key-value compaction operations from a host device to a storage device. The offloaded key-value compaction operations include sort-merge operations. The storage device is configured to store a plurality of key-value pairs configured as a Log-Structured Merge (LSM) tree. The storage device is configured to perform key-value compaction operations in response to a command from the host device. The command may include information related to key-value data to be sorted—merged. Performing the sort-merge operations by the storage device is configured to eliminate a majority of data transfers between the host device and the storage device, reduce host processor utilization and to exploit a media bandwidth within the storage device. Offloading sort-merge operations to the storage device may improve both power consumption and performance.

The host device and/or storage device is configured to define and/or update a data structure that specifies parameters associated with a sort-merge operation. The storage device may include a key-value compaction architecture, e.g., circuitry, configured to implement the sort-merge operation. The architecture is configured to facilitate parallel sort-merge processing for SSTable (sorted string table) files from different levels of the LSM tree. Thus, a majority of data transfers between the host device and the storage device related to compaction may be eliminated. Host device processor resource utilization may be reduced. A relatively higher internal read/write bandwidth of the storage device may be exploited to further enhance performance.

In an embodiment, a storage device includes a storage device controller and a plurality of nonvolatile media. The storage device controller contains a sort-merge logic and a sort-merge circuitry. The sort-merge logic is configured to identify a level N SSTable (sorted string table) file including at least one level N key-value (KV) pair, a corresponding level N index file, a first level N+1 SSTable file including at least one level N+1 key-value (KV) pair and a corresponding first level N+1 index file, in response to receiving a sort-merge command from a host device. The sort-merge circuitry is configured to perform a sort-merge of the level N SSTable file and the first level N+1 SSTable file to produce a first level N+1 output SSTable file and a first level N+1 output SSTable index file. The sort-merge command may include a level N SSTable file index, a value corresponding to a number of SSTable files included in level N+1 and a level N+1 start SSTable file index. The identifying is based, at least in part, on the level N SSTable file index and the level N+1 start SSTable file index.

Figure 1B:
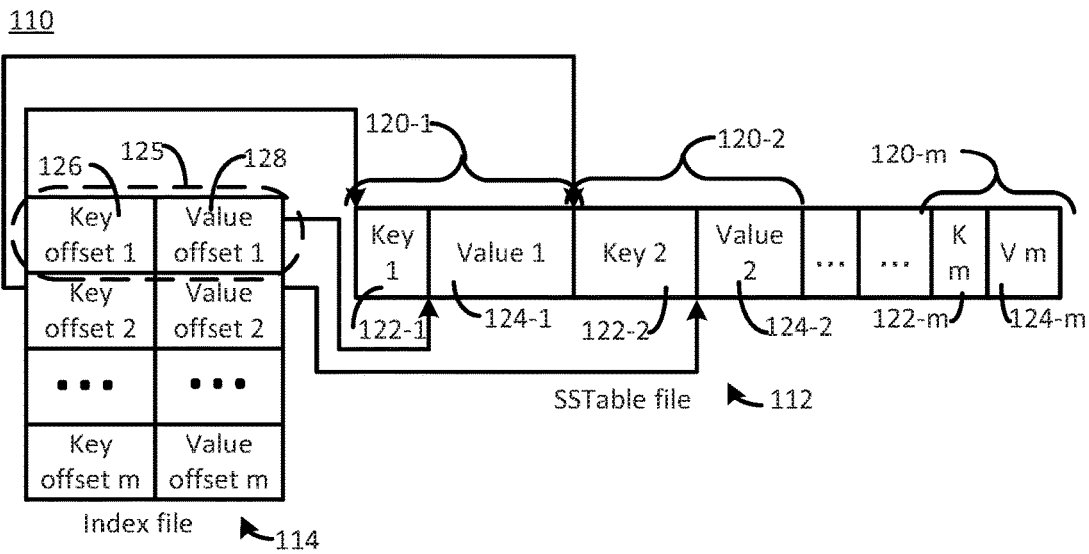
Figure 1C:
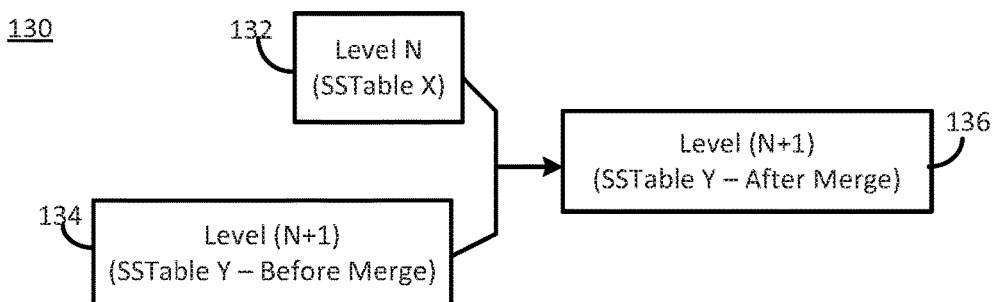

FIGS. 1A through 1C illustrate a structure and elements of a Log-Structured Merge (LSM) tree-based key-value storage system, consistent with several embodiments of the present disclosure. FIG. 1A illustrates a data layout 100 of a LSM tree. FIG. 1B illustrates a data structure 110 of an SSTable file 112 and a corresponding SSTable index file 114. FIG. 1C illustrates an example 130 sort-merge operation between an SSTable file included in level N and an SSTable file included in adjacent level N+1. FIGS. 1A through 1C may be best understood when considered together.

Turning first to FIG. 1A, the LSM tree based key-value storage system ("tree") 100 may be stored in a storage device, as described herein. The LSM tree 100 is configured to store data in a plurality of levels, L0, L1, L2, L3, . . . , Ln. Starting with Level L0, a respective size (i.e., storage capacity) of each subsequent level may be greater than a respective size of each prior level. In one nonlimiting example, a maximum size of level L0 may be about 4 Mebibytes (MiB, 1 MiB=$1024^2$ bytes), a maximum size of level L1 may be about 10 MiB and the maximum size of level L2 may be about 100 MiB.

At each level L0, L1, L2, L3, . . . , Ln, user data, i.e., a respective plurality of key-value ("KV") pairs, is stored in sorted string table (SSTable) files, sorted by the keys. Generally, SSTable files are not fragmented. Each level L0, L1, L2, L3, . . . , Ln, except possibly level L0, is configured to include a plurality of SSTable files. Generally, L0 may be maintained in host memory. Each SSTable file at a selected level is configured to include a non-overlapping range of keys. In some embodiments, a maximum number of SSTable files per level may be same for each level. In these embodiments, a size of each SSTable in a level may increase with level. In one nonlimiting example, the maximum number of SSTable files may be 10. In some embodiments, a respective size of an SSTable file included in a level N may be X times larger than the respective size of level N+1 SSTable files, where X is a configurable system parameter. In one non-limiting example, X may be 10.

Turning now to FIG. 1B, each SSTable file, e.g., SSTable file 112, in each level L0, L1, L2, L3, . . . , Ln, has an associated index file, e.g., index file 114. The SSTable file 112 includes a plurality of KV pairs 120-1, 120-2, . . . , 120-*m*. Each KV pair 120-1, 120-2, . . . , 120-*m* includes a respective key 122-1, 122-2, . . . , 122-*m*, and a corresponding respective value 124-1, 124-2, . . . , 124-*m*. The KV pairs 120-1, 120-2, . . . , 120-*m* included in SSTable file 112 have been sorted using the keys 122-1, 122-2, . . . , 122-*m*. As illustrated by SSTable file 112, each the key 122-1, 122-2, . . . , 122-*m* and each value 124-1, 124-2, . . . , 124-*m* may be of variable size.

The index file 114 is configured to point to each key 122-1, 122-2, . . . , 122-*m* and each value 124-1, 124-2, . . . , 124-*m* in the SSTable file 112. The index file 114 includes a plurality of key offset-value offset pairs, e.g., key offset-value offset pair 125. For example, key offset-value offset pair 125 includes a key offset 126 and a value offset 128. Continuing with this example, key offset 126 is configured to provide an offset to, e.g., point to, key 122-1 and value offset 128 is configured to provide an offset to, e.g., point to, value 124-1 that corresponds to key 122-1.

In operation, new KV pairs are written to a write ahead log, and may then be sort-merged to the lowest level (e.g., level L0) when the write ahead log is full. In other words, the new KV pairs are sorted according to respective keys prior to being written to level L0 of the LSM tree 100. When there is no available space left in L0, a sort-merge operation is triggered. The SSTable file in L0 may then be sorted-merged to L1, while eliminating KV pairs in L1 that have corresponding more current KV pairs in L0. In other words, the eliminated KV pair and corresponding current KV pair may each have a same key. Storage, e.g., memory, space that was occupied by L0 may then be freed, so that new KV pairs may be stored in level L0. The new KV pairs may be received from, for example, from the host device. When there is no space available in L1, a sort-merge operation from L1 to L2 is performed and so on for each level of the LSM tree 100.

FIG. 1C illustrates an example 130 sort-merge operation between an SSTable file included in a level N and an SSTable file included in an adjacent level N+1. In this example, SSTable file X 132 in level N is selected to be sorted merged into level N+1 (and SSTable file Y 134). A key range of SSTable file X 132 overlaps with a key range of SSTable file Y 134. The SSTable file X 132 and SSTable file Y 134 may be loaded into a memory. A linear sort-merge operation may then be performed, and the sort-merged result may be stored in a new SSTable file Y 136.

Thus, user data including a plurality of KV pairs may be configured as a Log-Structured Merge (LSM) tree. SSTable files may be updated and SSTable files in adjacent levels may be sort-merged, as described herein.

Figure 2:
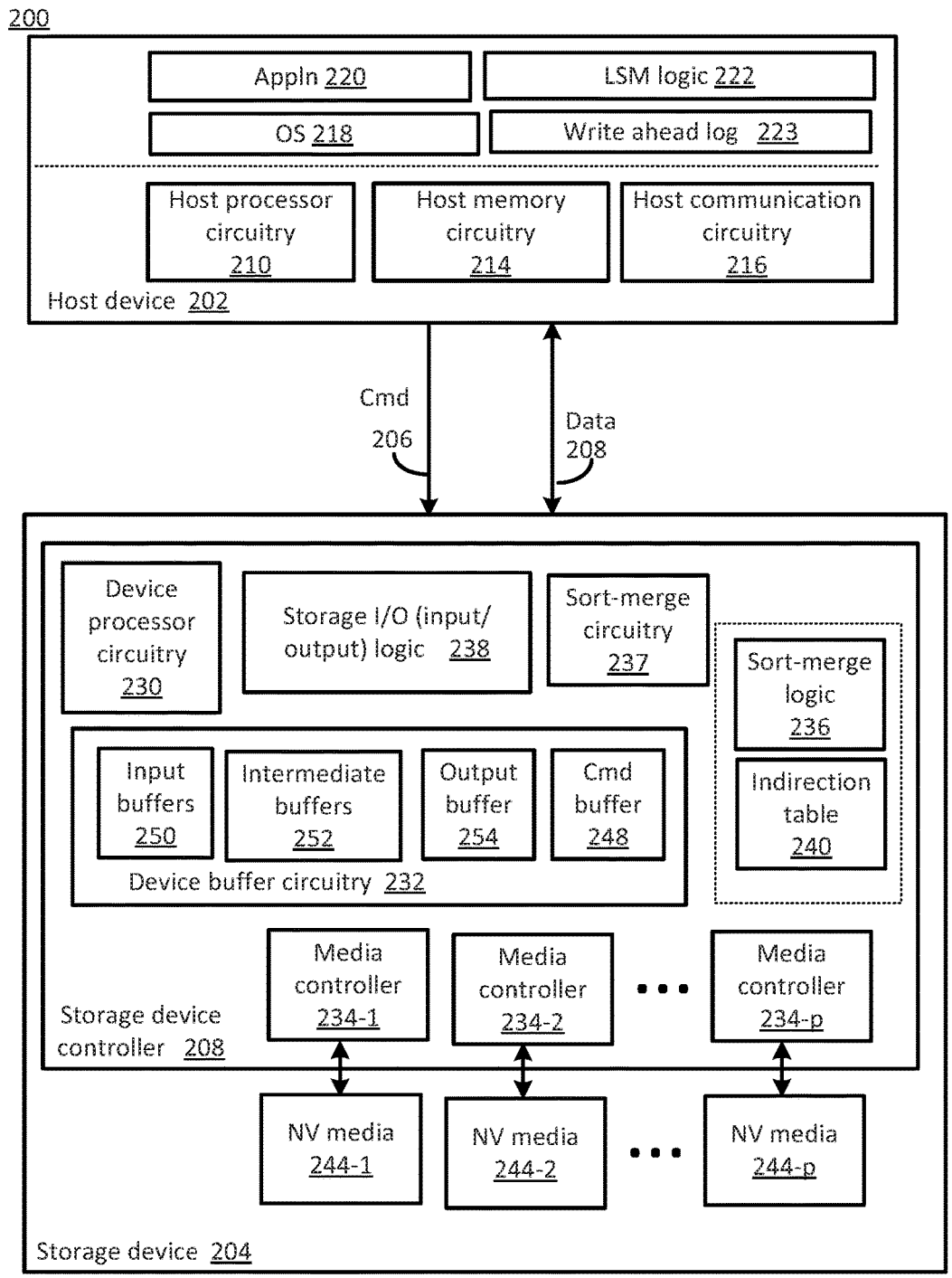
FIG. 2 illustrates a functional block diagram of a system that includes a key-value compaction system consistent with several embodiments of the present disclosure.

FIG. 2 illustrates a functional block diagram of a system 200 that includes a key-value compaction system consistent with several embodiments of the present disclosure. System 200 includes a host device 202 and a storage device 204. The storage device 204 may be coupled to and/or included in host device 202. The host device 202 is configured to provide a command 206 and/or data 208 to the storage device 204.

Host device 202 may include, but is not limited to, a mobile telephone including, but not limited to a smart phone (e.g., iPhone®, Android®-based phone, Blackberry®, Symbian®-based phone, Palm®-based phone, etc.); a wearable device (e.g., wearable computer, "smart" watches, smart glasses, smart clothing, etc.) and/or system; an Internet of Things (IoT) networked device including, but not limited to, a sensor system (e.g., environmental, position, motion, etc.) and/or a sensor network (wired and/or wireless); a computing system (e.g., a server, a workstation computer, a desktop computer, a laptop computer, a tablet computer (e.g., iPad®, GalaxyTab® and the like), an ultraportable computer, an ultramobile computer, a netbook computer and/or a subnotebook computer; etc. Host device 202 includes a host processor circuitry 210, a host memory circuitry 214 and a host communication circuitry 216. For example, host processor circuitry 210 may correspond to a single core or a multi-core general purpose processor, such as those provided by Intel® Corp., etc. Host device 202 may further include an operating system (OS) 218 and one or more applications, e.g., application 220. Application 220 may be configured to generate and/or utilize user data that may be stored as an LSM tree, as described herein. Host device 202 may further include an LSM logic 222. LSM logic 222 may be coupled to and/or included in OS 218 and/or application 220. During operation, host device 202 may include a write ahead log, e.g., write ahead log 223.

Storage device 204 may include, but is not limited to, a solid-state drive (SSD), a hard disk drive (HDD), a network attached storage (NAS) system, a storage area network (SAN) and/or a redundant array of independent disks (RAID) system, etc. Storage device 204 includes a storage device controller 208 and a plurality of nonvolatile (NV) media 244-1, 244-2, . . . , 244-*p*. NV media 244-1, 244-2, . . . , 244-*p* corresponds to a plurality of storage media that does not require power to maintain the state of data stored in the storage medium.

In one embodiment, each NV media 244-1, 244-2, . . . , 244-*p* may be a block addressable memory device, such as those based on NAND or NOR technologies. Each NV media 244-1, 244-2, . . . , 244-*p* may also include future generation nonvolatile devices, such as a three dimensional crosspoint memory device, or other byte addressable write-in-place nonvolatile memory devices. In an embodiment, each NV media 244-1, 244-2, . . . , 244-*p* may include, but is not limited to, a NAND flash memory (e.g., a Triple Level Cell (TLC) NAND, multi-threshold level NAND flash memory, or any other type of NAND (e.g., Single Level Cell (SLC), Multi Level Cell (MLC), Quad Level Cell (QLC), etc.)), NOR memory, NOR flash memory, solid state memory (e.g., planar or three Dimensional (3D) NAND flash memory or NOR flash memory), storage devices that use chalcogenide phase change material (e.g., chalcogenide glass), byte addressable nonvolatile memory devices, ferroelectric memory, silicon-oxide-nitride-oxide-silicon (SONOS) memory, polymer memory (e.g., ferroelectric polymer memory), byte addressable random accessible 3D crosspoint memory, ferroelectric transistor random access memory (Fe-TRAM), anti-ferroelectric memory, magnetoresistive random access memory (MRAM), memory that incorporates memristor technology, resistive memory including the metal oxide base, the oxygen vacancy base and the conductive bridge Random Access Memory (CB-RAM), single or multi-level phase change memory (PCM, PRAM), resistive memory, ferroelectric memory (F-RAM, FeRAM), spin-transfer torque memory (STT), spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, thermal assisted switching memory (TAS), millipede memory, floating junction gate memory (FJG RAM), magnetic tunnel junction (MTJ) memory, electrochemical cells (ECM) memory, binary oxide filament cell memory, interfacial switching memory, battery-backed RAM, ovonic memory, nanowire memory, electrically erasable programmable read-only memory (EEPROM), etc., or a combination of any of the above, or other memory. In some embodiments, NV media 244-1, 244-2, . . . , 244-p may refer to the die itself and/or to a packaged memory product. In some embodiments, the byte addressable random accessible 3D crosspoint memory may include a transistor-less stackable cross point architecture in which memory cells sit at the intersection of words lines and bit lines and are individually addressable and in which bit storage is based on a change in bulk resistance.

Storage device controller 208 includes a device processor circuitry 230, a device buffer circuitry 232, a storage I/O (input/output) logic 238 (e.g., a host protocol logic) and a plurality of media controller circuitries 234-1, 234-2, . . . , 234-p. Storage device controller 208 may further include a sort-merge logic 236. Storage device 204 and/or storage device controller 208 may further include a sort-merge circuitry 237. Storage device 204 and/or storage device controller 208 may include an indirection table 240, as described herein. Sort-merge circuitry 237 may be coupled to and/or included in the storage device controller 208. Sort-merge logic 236 may be coupled to and/or included in sort-merge circuitry 237. Device buffer circuitry 232 may include volatile random-access memory, e.g., dynamic random access memory (DRAM) and/or static random access memory (SRAM), etc. Device buffer circuitry 232 may be configured to store one or more of a plurality of input buffers 250, a plurality of intermediate buffers 252 and/or an output buffer 254, as described herein. Device buffer circuitry 232 may be further configured to store a command buffer 248. Each media controller circuitry 234-1, 234-2, . . . , 234-p is configured to retrieve stored data from device buffer circuitry 232 and store the retrieved data to a respective NV media 244-1, 244-2, . . . , 244-p. Device processor circuitry 230 may include, but is not limited to, a microcontroller, an application-specific integrated circuit (ASIC), a programmable logic device (PLD), a complex PLD, etc.

Storage I/O logic 238 is configured to couple the storage device 204 to the host device 202. An interface between the host device 202 and the storage device 204 may be termed a "frontend". An interface between the storage device controller 208 (e.g., the media controllers) and the NV media circuitry may be termed "backend". The frontend may comply and/or be compatible with one or more interface protocols including, but not limited to, PCIe (Peripheral Component Interconnect Express), NVMe (Non-Volatile Memory Express), SCSI (Small Computer System Interface), AHCI (Advance Host Controller Interface), SATA (Serial ATA (Advanced Technology Attachment)), PATA (Parallel ATA), etc. The backend may comply and/or be compatible with one or more protocols, e.g., ONFI (Open NAND Flash Interface), JEDEC (Joint Electron Device Engineering Council) standard JESD230C (NAND Flash Interface Interoperability), etc.

In operation, storage device 204 is configured to receive command(s) 206 and/or data 208 from host device 202. For example, storage I/O logic 238 may be configured to receive a sort-merge command from the host device 202, as described herein. The command(s) 206 and/or data 208 may be provided to storage device 204 by OS 218 and/or application 220 via LSM logic 222. The data 208 includes user data and thus may include one or more KV pairs. In one example, the data 208 may include a plurality of KV pairs corresponding to the write ahead log 223, as described herein. In another example, the data 208 may include a plurality of KV pairs sorted in an SSTable file, as described herein. Continuing with this example, the data may further include a corresponding index file, as described herein. Device communication interface circuitry 238 may be configured to receive the data 208. The data 208 may then be stored in device buffer circuitry 232 prior to being stored in NV media 244-1, 244-2, . . . , and/or 244-p.

In one nonlimiting example, host device 202, e.g., application 220, may be configured to receive, store and/or retrieve one or more records related to a database of user information, i.e., user data. The user data may be stored in an LSM tree based key-value data storage system that includes a plurality of levels L0, L1, . . . , Ln, e.g., LSM tree 100 of FIG. 1A.

Application 220, via LSM logic 222, may be configured to generate a respective KV pair corresponding to each record. Each new KV pair may then be appended to the write ahead log 223. The write ahead log 223 is configured to provide atomicity and durability in the data storage system. When the write ahead log 223 is full (e.g., contains a number of KV pairs equal to an SSTable file), a sort operation may be triggered configured to sort the KV pairs by key. The sort operation may be performed by LSM logic 222 or, for example, sort-merge logic 236. Thus, a corresponding SSTable file may be generated. LSM logic 222 and/or sort-merge logic 236 may be further configured to generate a corresponding SSTable index file and to add a corresponding entry to an indirection table, e.g., indirection table 240, as described herein. The SSTable file may then correspond to level L0 of the LSM tree. A sort-merge operation may then be triggered.

The SSTable file in level L0 may then be sorted-merged into level L1. KV pairs in level L1 that have corresponding (i.e., same key) more current KV pairs in level L0 may be replaced with KV pairs in level L0. Storage space, e.g., NV media, that was occupied by level L0 may then be freed, so that new KV pairs may be stored in level L0. When there is no space available in level L1, a sort-merge operation from level L1 to level L2 may be performed. Similarly, when there is no space available in level L2, a sort-merge operation from level L2 to level L3 may be performed and so on, to level Ln.

The number of SSTable files per level is a system parameter that may be preconfigured. Generally, Level L0 may be configured to include one SSTable file. Levels L1, L2, . . . , Ln may then each include at least one SSTable file. In some embodiments, the number of SSTable files may be the same for each level and a respective size of each SSTable file may increase with level. In some embodiments, the number of SSTable files may increase with level. For example, the size of the SSTable files may be the same across the levels. In another example, the size of the SSTable files may increase with level. In some embodiments, the number of levels (i.e., n+1) may configurable. The number of levels may be related to a storage capacity (i.e., NV media capacity) of the storage device 204.

The indirection table, e.g., indirection table 240, is configured to include SSTable file information for each SSTable file included in an LSM tree based KV data storage system and stored in, e.g., storage device 204 and NV media 244-1, 244-2, . . . , and/or 244-p. The indirection table 240 may be stored in device buffer circuitry 232 and/or NV media 244-1, 244-2, . . . , and/or 244-p. The indirection table 240 may be updated by LSM logic 222 and/or sort-merge logic 236 when a new SSTable file is generated and/or an SSTable file (and/or corresponding file index) is modified.

Table 1 illustrates one example of the contents of indirection table 240. The indirection table 240 is configured to include SSTable file information that may then be used by storage device 204 for performing corresponding sort—merge operations, as described herein. The indirection table 240 is configured to include SSTable file information for each SSTable file and each level of the corresponding LSM tree. The indirection table 240 is configured to include a number of SSTable File Indexes that corresponds to a number of SSTable files included in the corresponding LSM tree.

Table 1 illustrates one example SSTable file indirection table 240.

TABLE 1

| SSTable File Index (r) | SSTable File Information |
|---|---|
| 0 | SSTableFileInfo[0] |
| 1 | SSTableFileInfo[1] |
| ... | ... |
| R | SSTableFileInfo[R] |

Table 1 includes a number, R+1, SSTable file indexes and an array SSTableFileInfo that includes the number, R+1, array elements. Each SSTable file index, r, is configured to identify a corresponding SSTableFileInfo array element associated with that SSTable file index, r. Each SSTableFileInfo array element (i.e., SSTableFileInfo[r]) is configured to include information associated with a corresponding SSTable file. The SSTableFileInfo array is configured to include SSTable file information for each SSTable file included in the corresponding LSM tree.

Table 2 illustrates the contents of a respective array element of SSTableFileInfo, i.e., the contents of SSTableFileInfo[r]. Each SSTableFileInfo[r] array element corresponds to a respective SSTable file in the LSM tree stored in the storage device 204.

TABLE 2

| SSTableFileInfo |
|---|
| SSTable File Index |
| SSTable File Start LBA |
| SSTable File LBA Length |
| SSTable Index File Start LBA |
| SSTable Index File LBA Length |
| Number of KV pairs in this SSTable File |
| SSTable File Status |

SSTable File Index is a unique identifier (ID) for indexing this (i.e., associated) SSTable file. The SSTable File Index of Table 2 corresponds to the SSTable File Index of Table 1. The two SSTable file indexes may be utilized for validation and/or data integrity. Each SSTable file index may be calculated as: SSTable file index=Level*(Maximum number of SSTable Files per Level)+Sequence Number. Sequence number corresponds to a location, in a sequence of SSTable files in a level, this SSTable file is positioned. SSTable File Start LBA (Logical Block Address) corresponds to a start LBA of this SSTable file. SSTable File LBA Length corresponds to a size, in logical blocks, of this SSTable file. SSTable Index File Start LBA corresponds to a start LBA of this SSTable index file. SSTable Index File LBA Length corresponds to a size in logical blocks of the SSTable index file. Number of KV pairs in this SSTable File corresponds to the number of KV pairs in this SSTable file. SSTable File Status is configured to indicate whether this SSTable file is currently open or closed. "Open" corresponds to an SSTable file that may be read from or written to as part of an ongoing sort-merge operation. "Closed" corresponds to an SSTable file that is not being read from or written to as part of the sort-merge operation. For example, an SSTable file in level N+1 may be open during sort-merge operations while the SSTable file includes less than a maximum number of KV pairs and may be closed when the SSTable file reaches the maximum number of KV pairs.

Thus, an indirection table, e.g., indirection table 240, that includes an array of SSTable file information, may be updated by LSM logic 222 and/or sort-merge logic 236.

In response to a level becoming full, e.g., due to operation of application 220 and/or LSM logic 222, a sort-merge operation may be triggered. A level may be full when a maximum number of SSTable files each includes a maximum number of KV pairs. In an embodiment, LSM logic 222 may be configured to generate a sort-merge command and to provide the sort-merge command to the storage device 204. The sort-merge command may be received by sort-merge logic 236. Sort-merge logic 236 may then be configured to initiate sort-merge operations of sort-merge circuitry 237 based, at least in part, on the received sort-merge command.

The sort-merge command may be a vendor specific command or a standardized command. For example, the sort-merge command may comply and/or be compatible with one or more storage device interface specifications and/or protocols, e.g., NVMe (Non-Volatile Memory Express), SCSI (Small Computer System Interface), AHCI (Advance Host Controller Interface), SATA (Serial ATA (Advanced Technology Attachment)), PATA (Parallel ATA), etc. The sort-merge command is configured to instruct the storage device 204 to sort-merge a SSTable file included in level N with one or more SSTable files included in Level N+1. Level N+1 may then include one or more resulting new SSTable files that include one or more KV pairs from the SSTable in Level N.

Table 3 illustrates a command structure for the sort-merge command, consistent with several embodiments of the present disclosure. The sort-merge command, as illustrated in Table 3, includes a plurality of parameters in a corresponding plurality of fields. A first field is configured to include an SSTable File Index in Level N. A second field is configured to include a number of SSTable Files in Level N+1. A third field is configured to include a Start SSTable File Index in Level N+1. A fourth field is configured to include a command identifier (CMD ID) and a fifth field is configured to include a sort-merge command opcode.

TABLE 3

| SSTable File Index in Level N |
|---|
| Number of SSTable Files in Level N + 1 |
| Start SSTable File Index in Level N + 1 |
| CMD ID            Opcode |

The following description of Table 3 may be best understood when considered in combination with Tables 1 and 2. The SSTable File Index in Level N is configured to identify the SSTableFileInfo array element that corresponds to the SSTable file in Level N that is to be sort-merged with one or more SSTable files included in Level N+1. The number of SSTable Files in Level N+1 corresponds to the number of SSTable files in Level N+1 that are to be sort-merged with the identified SSTable file in Level N. The Start SSTable File Index in Level N+1 is configured to identify the first (i.e., start) SSTableFileInfo array element in the SSTableFileInfo array that corresponds to the first SSTable file in Level N+1. It may be appreciated that Number of SSTable Files in Level N+1 and Start SSTable File Index in Level N+1, together, are configured to identify all of the one or more SSTable files in Level N+1 that are to be sort-merged with the identified SSTable file in Level N.

In some situations, a key range of the SSTable file in level N may overlap a plurality of SSTable files in level N+1. A vendor specific sort-merge command may further include a field configured to indicate the number of overlapped SSTable files in level N+1. The overlapped SSTable files may then be loaded to the sort-merge circuitry 237 in sequential order and sort-merged with the SSTable file in level N. The sort-merged results may then be stored in new SSTable files in level N+1 and the "old" SSTable files in level N+1 may be discarded.

CMD ID is configured to indicate, e.g., select, one or more options associated with the sort-merge operation. For example, a CMD ID may be configured to select ascending or descending order of keys for the sort-merge operation. In another example, a CMD ID may be configured to indicate a value type, e.g., double, integer or string. In another example, a CMD ID may be configured to indicate a size of the value, e.g., 4 bytes, 8 bytes, etc. In another example, the CMD ID may be configured to indicate big endian or little endian control.

In some embodiments, CMD ID may be configured to indicate that the sort-merge operation should be modified to, at least initially, load only the keys and not the corresponding values. A corresponding value may then be loaded only if the corresponding value is used in the sort-merge operation. For example, if two keys (one from the SSTable in Level N and one from an SSTable in Level N+1) are the same, the KV pair associated with Level N+1 may be discarded. In other words, the corresponding KV pair associated with Level N may be newer than the KV pair associated with Level N+1. Thus, loading the value of the Level N+1 KV pair, that will be discarded, may be avoided.

Thus, a sort-merge command may be provided to the storage device 204 (and, e.g., sort-merge logic 236) by the host device 202 (and, e.g., LSM logic 222), in response to a level, e.g., Level N, of an LSM tree becoming full. Storage device 204, storage device controller 208 and/or, e.g., sort-merge logic 236 and sort-merge circuitry 237, may then be configured to perform the sort-merge operations based, at least in part, on the received sort-merge command.

Figure 3:
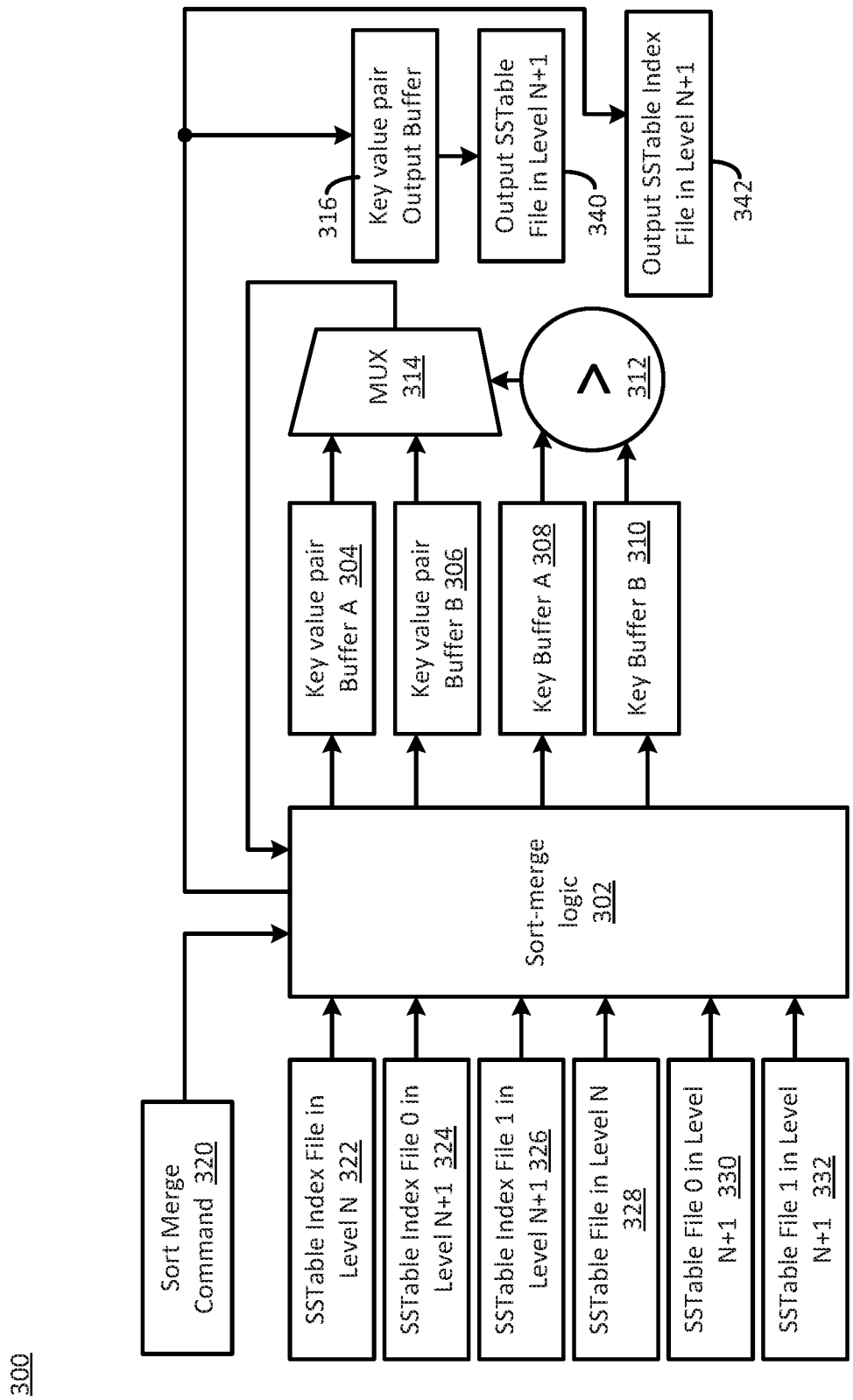
FIG. 3 illustrates one example key-value compaction architecture consistent with several embodiments of the present disclosure.

FIG. 3 illustrates one example key-value compaction architecture 300 consistent with several embodiments of the present disclosure. Key-value compaction architecture 300 is one example of sort-merge circuitry 237 of FIG. 2. In some embodiments, sort-merge circuitry 237 may include one key-value compaction architecture 300. In some embodiments, sort-merge circuitry 237 may include a plurality of key-value compaction architectures 300. The plurality of key-value compaction architectures 300 may perform a plurality of sort-merge operations in parallel (e.g., on different levels of the LSM tree). Performing the plurality of sort-merge operations in parallel is configured to exploit a relatively higher read/write bandwidth of the storage device 204 compared to the host device 202. Thus, an effective operating speed associated with the sort-merge operations may be increased and a corresponding a time duration associated with the sort-merge operations may be decreased.

Example key-value compaction architecture 300 includes a command buffer 320. Example 300 further includes a plurality of input buffers 322, 324, 326, 328, 330 and 332, a plurality of intermediate buffers 304, 306, 308 and 310 and an output buffer 316. Example 300 includes sort-merge logic 302, a multiplexer (MUX) 314 and comparator circuitry 312. Command buffer 320 corresponds to command buffer 248 of FIG. 2 and is configured to store a sort-merge command received from a host device, e.g., host device 202. The input buffers 322, 324, 326, 328, 330 and 332 are examples of input buffers 250 of FIG. 2. The intermediate buffers are examples of intermediate buffers 252 of FIG. 2. The output buffer 316 corresponds to output buffer 254 of FIG. 2. Example 300 further includes an output SSTable file 340 and an output SSTable index 342. The output SSTable file 340 and output SSTable index 342 may be stored in NV media 244-1, 244-2, . . . , and/or 244-p of FIG. 2.

A first input buffer 322 is configured to store an SSTable Index File in Level N. A second input buffer 324 is configured to store a first SSTable Index File 0 in Level N+1. A third input buffer 326 is configured to store a second SSTable Index File 1 in Level N+1. In some situations, the third input buffer 326 may not be used. For example, if only one SSTable file in Level N+1 is involved in the sort-merge operation, the third input buffer 326 may not be used. The second input buffer 324 and third input buffer 326 are configured to operate as ping pong buffers allowing one buffer to be loading while the other buffer is being operated on. Similar to the third input buffer 326, in some situations, the sixth input buffer 332 may not be used (i.e., if only one SSTable file in Level N+1 is involved in the sort-merge operation).

A fourth input buffer 328 is configured to store an SSTable File in Level N. A fifth input buffer 330 is configured to store a first SSTable File 0 in Level N+1. A sixth input buffer 332 is configured to store a second SSTable File 1 in Level N+1. In other words, the fifth input buffer 330 and sixth input buffer 332 are configured to operate as ping pong buffers allowing one buffer to be loading while the other buffer is being operated on.

In operation, sort-merge circuitry 237, e.g., example key-value compaction architecture 300, is configured to receive a sort-merge command from a host device, e.g., host device 202. The sort-merge command may be stored in the command buffer 320. Sort-merge logic 302 may then be configured to decode the sort-merge command 320. The sort-merge command 320 includes an SSTable File Index in Level N, a number of SSTable Files in Level N+1, a Start SSTable File Index in Level N+1 and a sort-merge command opcode and may include a command identifier, as described herein. Sort-merge logic 302 may then retrieve, e.g., read, the corresponding respective SSTableFileInfo array elements that corresponds to each SSTable File Index from indirection table 240. For example, the indirection table 240 may be retrieved from device buffer circuitry 232 and/or NV media 244-1, 244-2, . . . , and/or 244-p.

The sort-merge logic 302 is configured to load the SSTable index file in level N to the first input buffer 322 and the first SSTable index file in level N+1 to the second input buffer (SSTable Index File 0 in Level N+1) 324. The SSTable index file in level N and the first SSTable index file in level N+1 may be identified based, at least in part, on the SSTableFileInfo retrieved from indirection table 240. The sort-merge logic 302 is configured to load the SSTable file in level N to the fourth input buffer 328 and the first SSTable file in level N+1 to the fifth input buffer (SSTable File 0 in Level N+1) 330. The SSTable file in level N and the first SSTable file in level N+1 may be identified based, at least in part, on the SSTableFileInfo retrieved from indirection table 240. Sort-merge operations may then be initiated.

In some situations, the number of SSTable files in Level N+1 may be greater than one. In some situations (e.g., when the SSTable file in Level N overlaps a plurality of SSTable in Level N+1), the SSTable file in Level N may be sort-merged with a plurality of the SSTable files in Level N+1. The sort-merge logic 302 may then be configured to load the second (i.e., next) SSTable index file in level N+1 to the third input buffer (SSTable Index File 1 in Level N+1) 326. The second SSTable index file in level N+1 may be identified based, at least in part, on the SSTableFileInfo retrieved from indirection table 240. The sort-merge logic 302 is configured to load the second SSTable file in level N+1 to the sixth input buffer (SSTable File 1 in Level N+1) 332. The second SSTable file in level N+1 may be identified based, at least in part, on the SSTableFileInfo retrieved from indirection table 240.

The index files (e.g., index file 114 of FIG. 1A) pointed to by the SSTable file indexes include pointers (i.e., offsets) to each key and corresponding value of each KV pair included in a respective SSTable file. The sort-merge logic 302 is configured to sequentially load each Level N valid KV pair from the fourth input buffer 328 to a first intermediate buffer 304, i.e., to KV pair buffer A 304. As used herein, "valid KV pair" is a most recent copy of the KV pair associated with the corresponding key. For example, a host device may write the same key multiple times via, for example, a PUT(key, value) operation, or delete an existing key via DELETE(key) operation. These operations may then generate stale copies of the KV pairs. The sort-merge logic 302 is further configured to sequentially load each Level N+1 valid KV pair from the fifth input buffer 330 (or sixth input buffer 332) to a second intermediate buffer 306, i.e., to KV pair buffer B 306. The sort-merge logic 302 is further configured to sequentially load each key from a respective KV pair to a corresponding key buffer 308, 310. In other words, the sort-merge logic 302 is configured to load a corresponding key from the fourth input buffer (i.e., SSTable file in Level N) 328 to the third intermediate buffer (i.e., Key buffer A) 308 and a corresponding key from the fifth (or sixth) input buffer (i.e., SSTable file 0 (or 1) in Level N+1) 330 (or 332) to the fourth intermediate buffer (i.e., Key buffer B) 310.

The third and fourth intermediate buffers 308, 310 are coupled to respective inputs to comparator circuitry 312. Comparator circuitry 312 is configured to compare the two keys stored in key buffers A 308 and B 310. An output of comparator circuitry 312 is coupled to a selector input of MUX 314. The first and second intermediate buffers (i.e., KV pair buffer A and KV pair buffer B) 304, 306 are coupled to respective inputs to MUX 314. MUX 314 is configured to couple an output of MUX 314 to a selected MUX input based on a MUX 314 selector input, i.e., an output (i.e., comparison result) of comparator circuitry 312. If the Level N key (stored in Key buffer A 308) is less than the Level N+1 key (stored in Key buffer B 310), then the MUX 314 is configured to select the Level N key-value pair (stored in KV pair buffer A 304). If the Level N key (stored in Key buffer A 308) is greater than the Level N+1 key (stored in Key buffer B 310), then the MUX 314 is configured to select the Level N+1 key-value pair (stored in KV pair buffer B 306). If the Level N key (stored in Key buffer A 308) is equal to the Level N+1 key (stored in Key buffer B 310), then the MUX 314 is configured to select the Level N key-value pair (stored in KV pair buffer A 304. In other words, keys that are equal may correspond to a newer corresponding value in the KV pair in Level N compared to the corresponding value associated with that key in the KV pair in Level N+1. Sort-merge logic 302 is configured to store the output of MUX 314 to KV pair output buffer 316.

Sort-merge logic 302 is configured to update a corresponding SSTable index file in Level N+1 for each new key-value pair written to the SSTable file in level N+1. For example, a new entry may be created in the corresponding SSTable index file in level N+1. The new entry is configured to include a key offset and a value offset, as described herein. Sort-merge logic 302 may be further configured to update the indirection table 240, e.g., corresponding SSTable file LBA length, SSTable index file start LBA, SSTable index file LBA length and/or number of KV pairs in this SSTable file.

If the compared keys were not equal, the first or second intermediate buffer 304 or 306 corresponding to the selected KV pair may then be loaded with a corresponding next KV pair and the first or second intermediate buffer 304 or 306 corresponding to the not selected KV pair may then retain the not selected KV pair. If the compared keys were equal, the KV pair associated with the unselected KV pair (e.g., in Level N+1) may be discarded and each of the first and second buffers 304 and 306 may be loaded with a respective next KV pair. Each key buffer A 308 and key buffer B 310 may similarly be loaded with a respective key.

The loading of KV pairs into intermediate buffers 304, 306, the loading of corresponding keys into key buffers 308, 310, comparison of keys and selecting the KV pair associated with a same or smaller key operations may be repeated for each KV pair included in SSTable file in Level N 328. The sort-merge logic 302 may then be configured to switch to a next SSTable file in Level N+1. For example, if a current SSTable file in Level N+1 is stored in the fifth input buffer (i.e., SSTable File 0 in Level N+1) 330, the next SSTable file in Level N+1 may correspond to the SSTable file stored in the sixth input buffer (i.e., SSTable File 1 in Level N+1) 332. A new next Level N+1 SSTable file may then be loaded to the fifth input buffer 330. Conversely, if a current SSTable file in Level N+1 is stored in the sixth input buffer (i.e., SSTable File 1 in Level N+1) 332, the next SSTable file in Level N+1 may correspond to the SSTable file stored in the fifth input buffer (i.e., SSTable File 0 in Level N+1) 330. A new next Level N+1 SSTable file may then be loaded to the sixth input buffer 332. Thus, the fifth and sixth input buffers 330, 332 may correspond to "ping pong" buffers.

Similarly, if a current SSTable index file in Level N+1 is stored in the second input buffer (i.e., SSTable Index File 0 in Level N+1) 324, the next SSTable index file in Level N+1 may correspond to the SSTable index file stored in the third input buffer (i.e., SSTable Index File 1 in Level N+1) 326. A new next Level N+1 SSTable index file may then be loaded to the second input buffer 324. Conversely, if a current SSTable index file in Level N+1 is stored in the third input buffer (i.e., SSTable Index File 1 in Level N+1) 326, the next SSTable index file in Level N+1 may correspond to the SSTable index file stored in the second input buffer (i.e., SSTable Index File 0 in Level N+1) 324. A new next Level N+1 SSTable index file may then be loaded to the third input buffer 326. Thus, the second and third input buffers 324, 326 may similarly correspond to "ping pong" buffers.

The operations may be repeated for each SSTable file in Level N+1. When the KV pair output buffer 316 includes a target number of sorted merged KV pairs, e.g., corresponding to a maximum size of an SSTable file in Level N+1, the contents of KV pair output buffer 316 may be written to a new SSTable file in level N+1 340. Similarly, the corresponding SSTable index file may be written to a corresponding SSTable index file in Level N+1 342. The indirection table 240 may then be updated to include an array element corresponding to the new SSTable file in Level N+1. The indirection table 240 may be further updated to delete the array element corresponding to the SSTable file in Level N after all of the SSTable files in Level N+1 have been sort-merged with the SSTable file in Level N.

In some situations, Level N may include a plurality of SSTable files. The example key-value compaction architecture 300 may be configured to repeat the operations, as described herein, for each SSTable file in Level N.

In some situations, during comparison operations, a first key corresponding to a last KV pair in a first SSTable file in Level N or in Level N+1 may be compared to a second key (in a second SSTable file in Level N+1 or Level N) that is not associated with a last KV pair. In other words, the second SSTable file may include one or more KV pairs following the second key. In these situations, the remaining KV pairs that have not been compared may be written to the KV pair output buffer 316. In other words, since there are not keys to compare to, the sort-merge operation may be completed for these SSTable files by storing the remaining KV pairs form the second SSTable file. The use of "first" and "second" in this context is merely to differentiate between the two keys and two SSTable files and do not necessarily indicate order.

In some embodiments, rather than using files, e.g., SSTable index files and/or SSTable files, the KV pairs and corresponding pointers to keys and values may be defined by logical block addresses (LBAs).

In some embodiments, sort-merge logic 302 may be configured to initially load the SSTable index files to respective input buffers 322, 324 and/or 326 and only respective keys to intermediate buffers 308 and 310. In other words, initially, sort-merge logic 302 may not load the values corresponding to the keys. Corresponding values may be read later, if warranted. For example, if the keys being compared are equal, then the value associated with the key from the SSTable file included in Level N+1 may not be loaded since it is discarded.

Turning again to FIG. 2, storage device controller 208 includes a plurality of media controllers 234-1, 234-2, ..., 234-p and storage device 204 includes a corresponding plurality of NV media 244-1, 244-2, ..., 244-p, as described herein. As further described herein, in some embodiments, sort-merge circuitry 237 may include a plurality of instances of example key-value compaction architecture 300. For example, a storage device, e.g., storage device 204, may include 4, 8, 16 or more media controller channels, i.e., media controller to corresponding NV media links, e.g., backend. The number of media controller channels may be related to desired performance. In one nonlimiting example, the number of media channels may be eight. Continuing with this example, the eight channels may operate, for example, at a maximum frequency of 400 MHz (Megahertz) in DDR (double data rate) mode and may thus realize up to 800 MB/s BW (i.e., 800 Megabytes per second bandwidth) per channel for a total of 6.4 GB/s (Gigabytes per second). The host device 202 BW (bandwidth) may be limited by the interface between the host device 202 and the storage device (i.e., the frontend) 204 by a number of lanes. A maximum realizable BW may then be approximately 3.2 GB/s after all the overheads are subtracted. Typically, the backend (i.e., the media controller to NV media interface) is operated slower than the frontend (i.e., the host device 202 to storage device 204 interface). When the storage device 204 is performing sort-merge operations as described herein, performance may be enhanced by operating the backend faster than the frontend. Once the sort-merge operations are completed, the backend can be reverted back to slower frequency for power savings.

In another example, at least some storage devices may have a higher read bandwidth relative to a host device, e.g., a storage device may have a read bandwidth that is 2 to 4 times the read bandwidth of the host device. Performing the sort-merge operations on the storage device may reduce the host software stack latency on a file system and device driver, further improving speed. It is contemplated that a performance increase of at least 2× relative to performing sort-merge operations by the host device may be achievable.

Thus, performing the sort-merge operations by the storage device is configured to eliminate a majority of data transfers between the host device and the storage device, reduce host processor utilization and to exploit a media bandwidth within the storage device. Offloading sort-merge operations to the storage device may improve both power consumption and performance.

Figure 4:
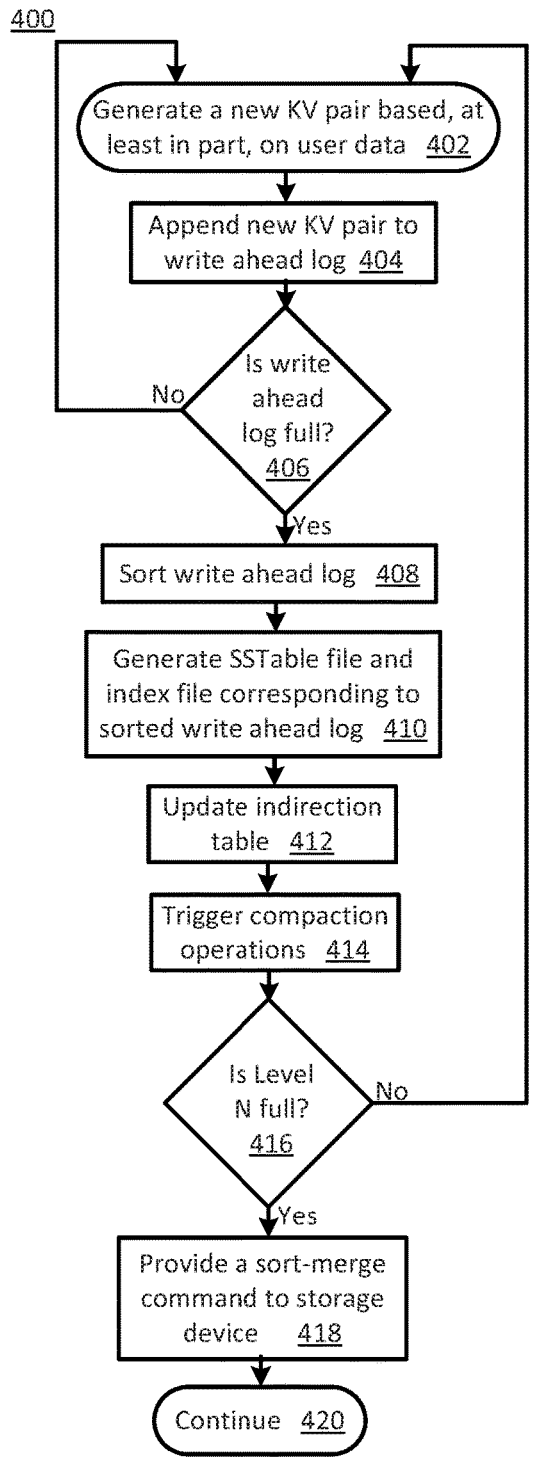
FIG. 4 is a flowchart of SSTable-related operations according to various embodiments of the present disclosure.

FIG. 4 is a flowchart 400 of SSTable-related operations according to various embodiments of the present disclosure. In particular, the flowchart 400 illustrates generating an SSTable file and corresponding index file and triggering compaction (i.e., sort-merge) operations on a storage device. The operations may be performed, for example, by host device 202, e.g., LSM logic 222, storage device 204 and/or storage device controller 208, e.g., sort-merge logic 236, of FIG. 2.

Operations of this embodiment may begin with generating a new KV pair based, at least in part, on user data at operation 402. Operation 404 may include appending the new KV pair to a write ahead log. Whether the write ahead log is full may be determined at operation 406. If the write ahead log is not full, program flow may proceed to operation 402.

If the write ahead log is full, the write ahead log may be sorted at operation 408. For example, LSM logic 222 may be configured to sort the write ahead log. An SSTable file and index file corresponding to the sorted write ahead log may be generated at operation 410. An indirection table may be updated at operation 412. Updating the indirection table is configured to add an array element corresponding to the new SSTable file. Compaction operations may be triggered at operation 414. For example, compaction operations may be triggered by providing a sort-merge command to the storage device, as described herein. The sort-merge operations are configured to sort-merge the new SSTable file into an LSM tree. Whether Level N is full may be determined at operation 416. If Level N is not full, program flow may proceed to operation 402. If Level N is full, a sort-merge command may be provided to a storage device at operation 418. Program flow may then continue at operation 420.

Thus, an SSTable file and corresponding index file may be generated and compaction operations by a storage device may be triggered.

Figure 5:
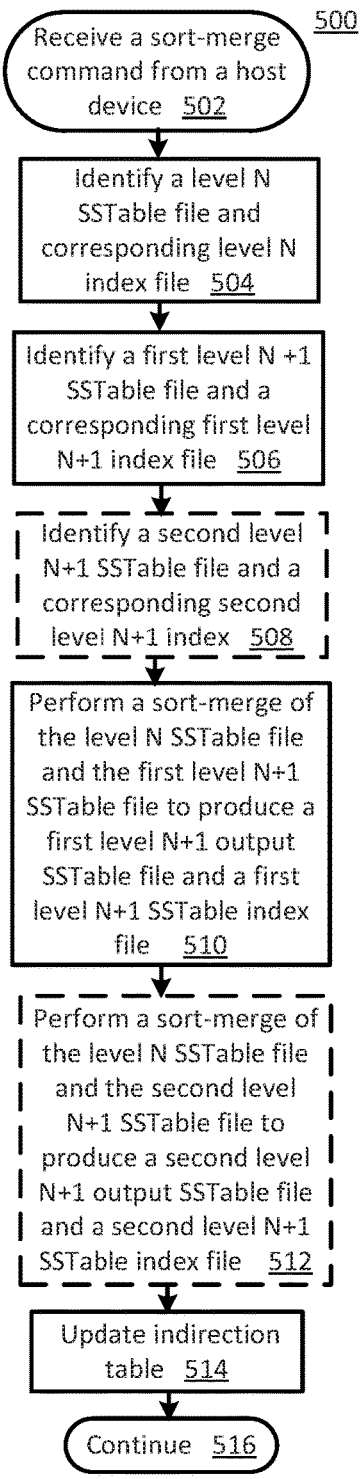
FIG. 5 is a flowchart of sort-merge operations according to various embodiments of the present disclosure.

FIG. 5 is a flowchart 500 of sort-merge operations according to various embodiments of the present disclosure. In particular, the flowchart 500 illustrates performing a sort-merge operation of a level N SSTable file and a level N+1 SSTable file in response to a sort-merge command from a host device. The operations may be performed, for example, by storage device 204 and/or storage device controller 208, e.g., sort-merge logic 236 and/or sort-merge circuitry 237, of FIG. 2.

Operations of this embodiment may begin with receiving a sort-merge command from a host device at operation 502.

A level N SS table file and corresponding level N index file may be identified at operation 504. A first level N+1 SS table file and a corresponding first level N+1 index file may be identified at operation 506. In some embodiments, a second level N+1 SSTable file and a corresponding second level N+1 index file may be identified at operation 508. The SSTable files may be identified based, at least in part, on the received sort-merge command. A sort-merge of the level N SSTable file and the first level N+1 SS table file may be performed to produce a first level N+1 output SSTable file and a first level N+1 SSTable index file at operation 510. In some embodiments, a sort-merge of the level N SS table file and the second level N+1 SS table file may be performed to produce a second level N+1 output SSTable file and a second level N+1 SSTable index file at operation 512. An indirection table may be updated at operation 514. Program flow may then continue at operation 516.

Thus, a sort-merge of a level N SSTable file and one or more level N+1 SSTable file(s) may be performed in response to a sort-merge command from a host device.

While the flowcharts of FIGS. 4 and 5 illustrate operations according various embodiments, it is to be understood that not all of the operations depicted in FIGS. 4 and 5 are necessary for other embodiments. In addition, it is fully contemplated herein that in other embodiments of the present disclosure, the operations depicted in FIGS. 4 and/or 5 and/or other operations described herein may be combined in a manner not specifically shown in any of the drawings, and such embodiments may include less or more operations than are illustrated in FIGS. 4 and 5. Thus, claims directed to features and/or operations that are not exactly shown in one drawing are deemed within the scope and content of the present disclosure.

As used in any embodiment herein, the term "logic" may refer to an app, software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices.

"Circuitry," as used in any embodiment herein, may comprise, for example, singly or in any combination, hardwired circuitry, programmable circuitry, state machine circuitry, logic and/or firmware that stores instructions executed by programmable circuitry. The circuitry may be embodied as an integrated circuit, such as an integrated circuit chip. In some embodiments, the circuitry may be formed, at least in part, by the processors 210, 230 executing code and/or instructions sets (e.g., software, firmware, etc.) corresponding to the functionality described herein, thus transforming a general-purpose processor into a specific-purpose processing environment to perform one or more of the operations described herein. In some embodiments, the various components and circuitry of the memory controller circuitry or other systems may be combined in a system-on-a-chip (SoC) architecture.

The foregoing provides example system architectures and methodologies, however, modifications to the present disclosure are possible. The processor may include one or more processor cores and may be configured to execute system software. System software may include, for example, an operating system. Device memory may include I/O memory buffers configured to store one or more data packets that are to be transmitted by, or received by, a network interface.

The operating system (OS) 218 may be configured to manage system resources and control tasks that are run on, e.g., host device 202. For example, the OS may be implemented using Microsoft® Windows®, HP-UX®, Linux®, or UNIX®, although other operating systems may be used. In another example, the OS may be implemented using Android™, iOS, Windows Phone® or BlackBerry®. In some embodiments, the OS may be replaced by a virtual machine monitor (or hypervisor) which may provide a layer of abstraction for underlying hardware to various operating systems (virtual machines) running on one or more processing units. The operating system and/or virtual machine may implement a protocol stack. A protocol stack may execute one or more programs to process packets. An example of a protocol stack is a TCP/IP (Transport Control Protocol/Internet Protocol) protocol stack comprising one or more programs for handling (e.g., processing or generating) packets to transmit and/or receive over a network.

Host memory circuitry 212 may include one or more of the following types of memory: semiconductor firmware memory, programmable memory, nonvolatile memory, read only memory, electrically programmable memory, random access memory, flash memory, magnetic disk memory, and/or optical disk memory. Either additionally or alternatively system memory may include other and/or later-developed types of computer-readable memory.

Embodiments of the operations described herein may be implemented in a computer-readable storage device having stored thereon instructions that when executed by one or more processors perform the methods. The processor may include, for example, a processing unit and/or programmable circuitry. The storage device may include a machine readable storage device including any type of tangible, non-transitory storage device, for example, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of storage devices suitable for storing electronic instructions.

Host storage logic 222 and device storage logic 236 may be configured to provide and execute, respectively, command 206, as described herein. LSM logic 222, sort-merge logic 236 and/or command 206 may comply or be compatible with a nonvolatile memory (NVM) specification related to communication with and operation of storage devices. For example, LSM logic 222, sort-merge logic 236 and/or command 206 may comply with a NVM specification titled: NVM Express®, Revision 1.2, released November 2014, by NVM Express Workgroup, and/or Revision 1.2.1, released June 2016, and/or later and/or related versions of this specification, e.g., Revision 1.3, released May 2017.

In some embodiments, a hardware description language (HDL) may be used to specify circuit and/or logic implementation(s) for the various logic and/or circuitry described herein. For example, in one embodiment the hardware description language may comply or be compatible with a very high speed integrated circuits (VHSIC) hardware description language (VHDL) that may enable semiconductor fabrication of one or more circuits and/or logic described herein. The VHDL may comply or be compatible with IEEE Standard 1076-1987, IEEE Standard 1076.2, IEEE1076.1, IEEE Draft 3.0 of VHDL-2006, IEEE Draft 4.0 of VHDL- 2008 and/or other versions of the IEEE VHDL standards and/or other hardware description standards.

In some embodiments, a Verilog hardware description language (HDL) may be used to specify circuit and/or logic implementation(s) for the various logic and/or circuitry described herein. For example, in one embodiment, the HDL may comply or be compatible with IEEE standard 62530-2011: SystemVerilog—Unified Hardware Design, Specification, and Verification Language, dated Jul. 7, 2011; IEEE Std 1800™-2012: IEEE Standard for SystemVerilog-Unified Hardware Design, Specification, and Verification Language, released Feb. 21, 2013; IEEE standard 1364-2005: IEEE Standard for Verilog Hardware Description Language, dated Apr. 18, 2006 and/or other versions of Verilog HDL and/or SystemVerilog standards.

EXAMPLES

Examples of the present disclosure include subject material such as a method, means for performing acts of the method, a device, or of an apparatus or system related to key-value compaction, as discussed below.

Example 1

According to this example, there is provided a storage device. The storage device includes a storage I/O (input/output) logic and a storage device controller. The storage I/O (input/output) logic is to couple the storage device to a host device, the storage I/O logic to receive a sort-merge command the host device. The a storage device controller is to identify a level N SSTable (sorted string table) file, a corresponding level N index file, a first level N+1 SSTable file and a corresponding first level N+1 index file, in response to the sort-merge command to be received from the host device. The storage device controller is further to perform a sort-merge of the level N SSTable file and the first level N+1 SSTable file to produce a first level N+1 output SSTable file and a first level N+1 output SSTable index file. The level N SSTable file includes at least one level N key-value (KV) pair. The level N+1 SSTable file includes at least one level N+1 key-value (KV) pair. The sort-merge command includes a level N SSTable file index, a value corresponding to a number of SSTable files included in level N+1 and a level N+1 start SSTable file index. The identifying is based, at least in part, on the level N SSTable file index and the level N+1 start SSTable file index.

Example 2

This example includes the elements of example 1, wherein the storage device controller is to identify a second level N+1 SSTable file and a corresponding second level N+1 index file based, at least in part, on the level N+1 start SSTable file index, and the storage device controller is to perform a sort-merge of the level N SSTable file and the second level N+1 SSTable file to produce a second level N+1 output SSTable file and a second level N+1 output SSTable index file.

Example 3

This example includes the elements of example 1, wherein the storage device controller is to at least one of access and/or update an indirection table, the indirection table including an array of SSTable file information array elements, each array element corresponding to a respective SSTable file.

Example 4

This example includes the elements of example 1, wherein performing the sort-merge includes comparing a level N key from the level N key-value pair to a level N+1 key from the level N+1 key-value pair and selecting the level N key-value pair if the level N key is less than or equal to the level N+1 key or selecting the level N+1 key-value pair if the level N key is greater than the level N+1 key.

Example 5

This example includes the elements of example 3, wherein each array element includes an SSTable file index, an SSTable file start logical block address (LBA), an SSTable file LBA length, an SSTable index file start LBA, an SSTable index file LBA length, a number of key-value (KV) pairs included in the respective SSTable file and an SSTable file status.

Example 6

This example includes the elements according to any one of examples 1 to 4, wherein the storage device controller comprises a sort-merge circuitry comprising at least one key-value compaction architecture.

Example 7

This example includes the elements according to any one of examples 1 to 4, wherein the sort-merge command includes a command identifier field.

Example 8

This example includes the elements of example 7, wherein the sort-merge command further includes a field to indicate a number of SSTable files in level N+1 overlapped by the level N SSTable file.

Example 9

This example includes the elements according to any one of examples 1 to 4, wherein the storage device controller includes a sort-merge circuitry including a command buffer to store the sort-merge command, a plurality of input buffers to store selected SS table files and selected SS table file indexes, a comparator to compare selected keys, a multiplexer, a plurality of intermediate buffers and an output buffer to store each level N+1 output SSTable file.

Example 10

According to this example, there is provided a method. The method includes coupling, by a storage I/O (input/output) logic, a storage device to a host device, the storage I/O logic to receive a sort-merge command the host device; identifying, by a storage device controller, a level N SSTable (sorted string table) file, a corresponding level N index file, a first level N+1 SSTable file and a corresponding first level N+1 index file, in response to the sort-merge command to be received from the host device. The method further includes performing, by the storage device controller, a sort-merge of the level N SSTable file and the first level N+1 SSTable file to produce a first level N+1 output SSTable file and a first level N+1 output SSTable index file. The level N SSTable file includes at least one level N key-value (KV) pair. The level N+1 SSTable file includes at least one level N+1 key-value (KV) pair. The sort-merge command includes a level N SSTable file index, a value corresponding to a number of SSTable files included in level N+1 and a level N+1 start SSTable file index. The identifying is based, at least in part, on the level N SSTable file index and the level N+1 start SSTable file index.

Example 11

This example includes the elements of example 10, further including identifying, by the storage device controller, a second level N+1 SSTable file and a corresponding second level N+1 index file based, at least in part, on the level N+1 start SSTable file index, and performing, by the sort-merge circuitry, a sort-merge of the level N SSTable file and the second level N+1 SSTable file to produce a second level N+1 output SSTable file and a second level N+1 output SSTable index file.

Example 12

This example includes the elements of example 10, further including at least one of accessing and/or updating, by the storage device controller, an indirection table, the indirection table including an array of SSTable file information array elements, each array element corresponding to a respective SSTable file.

Example 13

This example includes the elements of example 10, wherein performing the sort-merge includes comparing a level N key from the level N key-value pair to a level N+1 key from the level N+1 key-value pair and selecting the level N key-value pair if the level N key is less than or equal to the level N+1 key or selecting the level N+1 key-value pair if the level N key is greater than the level N+1 key.

Example 14

This example includes the elements of example 12, wherein each array element includes an SSTable file index, an SSTable file start logical block address (LBA), an SSTable file LBA length, an SSTable index file start LBA, an SSTable index file LBA length, a number of key-value (KV) pairs included in the respective SSTable file and an SSTable file status.

Example 15

This example includes the elements of example 10, wherein the storage device controller comprises a sort-merge circuitry comprising at least one key-value compaction architecture.

Example 16

This example includes the elements of example 10, wherein the sort-merge command includes a command identifier field.

Example 17

This example includes the elements of example 16, wherein the sort-merge command further includes a field to indicate a number of SSTable files in level N+1 overlapped by the level N SSTable file.

Example 18

According to this example, there is provided system. The system includes a storage device. The storage device includes a plurality of nonvolatile media, a storage I/O (input/output) logic and a storage device controller. The storage device controller is to identify a level N SSTable (sorted string table) file, a corresponding level N index file, a first level N+1 SSTable file and a corresponding first level N+1 index file, in response to the sort-merge command to be received from the host device. The storage device controller is to perform a sort-merge of the level N SSTable file and the first level N+1 SSTable file to produce a first level N+1 output SSTable file and a first level N+1 output SSTable index file. The level N SSTable file includes at least one level N key-value (KV) pair. The level N+1 SSTable file includes at least one level N+1 key-value (KV) pair. The sort-merge command includes a level N SSTable file index, a value corresponding to a number of SSTable files included in level N+1 and a level N+1 start SSTable file index. The identifying is based, at least in part, on the level N SSTable file index and the level N+1 start SSTable file index.

Example 19

This example includes the elements of example 18, wherein the storage device controller is to identify a second level N+1 SSTable file and a corresponding second level N+1 index file based, at least in part, on the level N+1 start SSTable file index, and the storage device controller is to perform a sort-merge of the level N SSTable file and the second level N+1 SSTable file to produce a second level N+1 output SSTable file and a second level N+1 output SSTable index file.

Example 20

This example includes the elements of example 18, wherein the storage device controller is to at least one of access and/or update an indirection table, the indirection table including an array of SSTable file information array elements, each array element corresponding to a respective SSTable file.

Example 21

This example includes the elements of example 18, wherein performing the sort-merge includes comparing a level N key from the level N key-value pair to a level N+1 key from the level N+1 key-value pair and selecting the level N key-value pair if the level N key is less than or equal to the level N+1 key or selecting the level N+1 key-value pair if the level N key is greater than the level N+1 key.

Example 22

This example includes the elements of example 20, wherein each array element includes an SSTable file index, an SSTable file start logical block address (LBA), an SSTable file LBA length, an SSTable index file start LBA, an SSTable index file LBA length, a number of key-value (KV) pairs included in the respective SSTable file and an SSTable file status.

Example 23

This example includes the elements according to any one of examples 18 to 21, wherein the storage device controller comprises a sort-merge circuitry comprising at least one key-value compaction architecture.

Example 24

This example includes the elements according to any one of examples 18 to 21, wherein the sort-merge command includes a command identifier field.

Example 25

This example includes the elements of example 24, wherein the sort-merge command further includes a field to indicate a number of SSTable files in level N+1 overlapped by the level N SSTable file.

Example 26

This example includes the elements according to any one of examples 18 to 21, wherein the storage device controller includes a sort-merge circuitry including a command buffer to store the sort-merge command, a plurality of input buffers to store selected SS table files and selected SS table file indexes, a comparator to compare selected keys, a multiplexer, a plurality of intermediate buffers and an output buffer to store each level N+1 output SSTable file.

Example 27

This example includes the elements according to any one of examples 18 to 21, wherein the storage device is selected from the group including a solid-state drive (SSD), a hard disk drive (HDD), a network attached storage (NAS) system, a storage area network (SAN) and/or a redundant array of independent disks (RAID) system.

Example 28

This example includes the elements according to any one of examples 18 to 21, wherein each of the plurality of nonvolatile media is selected from the group including a NAND flash memory, a NOR memory, a solid state memory, byte addressable nonvolatile memory devices, ferroelectric memory, silicon-oxide-nitride-oxide-silicon (SONOS) memory, polymer memory, byte addressable random accessible three dimensional crosspoint memory, ferroelectric transistor random access memory, magnetoresistive random access memory, phase change memory, resistive memory, ferroelectric memory, spin-transfer torque memory, thermal assisted switching memory (TAS), millipede memory, floating junction gate memory (FJG RAM), magnetic tunnel junction (MTJ) memory, electrochemical cells (ECM) memory, binary oxide filament cell memory, interfacial switching memory, battery-backed RAM, ovonic memory, nanowire memory and/or electrically erasable programmable read-only memory (EEPROM).

Example 29

According to this example, there is provided a computer readable storage device. The device has stored thereon instructions that when executed by one or more processors result in the following operations including: coupling a storage device to a host device, a storage I/O logic to receive a sort-merge command the host device; identifying a level N SSTable (sorted string table) file, a corresponding level N index file, a first level N+1 SSTable file and a corresponding first level N+1 index file, in response to the sort-merge command to be received from the host device; and performing a sort-merge of the level N SSTable file and the first level N+1 SSTable file to produce a first level N+1 output SSTable file and a first level N+1 output SSTable index file. The level N SSTable file includes at least one level N key-value (KV) pair. The level N+1 SSTable file includes at least one level N+1 key-value (KV) pair. The sort-merge command includes a level N SSTable file index, a value corresponding to a number of SSTable files included in level N+1 and a level N+1 start SSTable file index. The identifying is based, at least in part, on the level N SSTable file index and the level N+1 start SSTable file index.

Example 30

This example includes the elements of example 29, wherein the instructions that when executed by one or more processors results in the following additional operations including identifying a second level N+1 SSTable file and a corresponding second level N+1 index file based, at least in part, on the level N+1 start SSTable file index, and performing a sort-merge of the level N SSTable file and the second level N+1 SSTable file to produce a second level N+1 output SSTable file and a second level N+1 output SSTable index file.

Example 31

This example includes the elements of example 29, wherein the instructions that when executed by one or more processors results in the following additional operations including at least one of accessing and/or updating an indirection table, the indirection table including an array of SSTable file information array elements, each array element corresponding to a respective SSTable file.

Example 32

This example includes the elements of example 29, wherein performing the sort-merge includes comparing a level N key from the level N key-value pair to a level N+1 key from the level N+1 key-value pair and selecting the level N key-value pair if the level N key is less than or equal to the level N+1 key or selecting the level N+1 key-value pair if the level N key is greater than the level N+1 key.

Example 33

This example includes the elements of example 31, wherein each array element includes an SSTable file index, an SSTable file start logical block address (LBA), an SSTable file LBA length, an SSTable index file start LBA, an SSTable index file LBA length, a number of key-value (KV) pairs included in the respective SSTable file and an SSTable file status.

Example 34

This example includes the elements according to any one of examples 29 to 32, wherein the sort-merge command includes a command identifier field.

Example 35

This example includes the elements of example 34, wherein the sort-merge command further includes a field to indicate a number of SSTable files in level N+1 overlapped by the level N SSTable file.

Example 36

According to this example, there is provided a storage device. The storage device includes means for coupling, by a storage I/O (input/output) logic, a storage device to a host device, the storage I/O logic to receive a sort-merge command the host device; means for identifying, by a storage device controller, a level N SSTable (sorted string table) file, a corresponding level N index file, a first level N+1 SSTable file and a corresponding first level N+1 index file, in response to the sort-merge command to be received from the host device; and means for performing, by a sort-merge circuitry, a sort-merge of the level N SSTable file and the first level N+1 SSTable file to produce a first level N+1 output SSTable file and a first level N+1 output SSTable index file. The level N SSTable file includes at least one level N key-value (KV) pair. The level N+1 SSTable file includes at least one level N+1 key-value (KV) pair. The sort-merge command includes a level N SSTable file index, a value corresponding to a number of SSTable files included in level N+1 and a level N+1 start SSTable file index. The identifying is based, at least in part, on the level N SSTable file index and the level N+1 start SSTable file index.

Example 37

This example includes the elements of example 36, further including means for identifying, by the storage device controller, a second level N+1 SSTable file and a corresponding second level N+1 index file based, at least in part, on the level N+1 start SSTable file index, and means for performing, by the sort-merge circuitry, a sort-merge of the level N SSTable file and the second level N+1 SSTable file to produce a second level N+1 output SSTable file and a second level N+1 output SSTable index file.

Example 38

This example includes the elements of example 36, further including means for at least one of accessing and/or updating, by the storage device controller, an indirection table, the indirection table including an array of SSTable file information array elements, each array element corresponding to a respective SSTable file.

Example 39

This example includes the elements of example 36, wherein performing the sort-merge includes comparing a level N key from the level N key-value pair to a level N+1 key from the level N+1 key-value pair and selecting the level N key-value pair if the level N key is less than or equal to the level N+1 key or selecting the level N+1 key-value pair if the level N key is greater than the level N+1 key.

Example 40

This example includes the elements of example 38, wherein each array element includes an SSTable file index, an SSTable file start logical block address (LBA), an SSTable file LBA length, an SSTable index file start LBA, an SSTable index file LBA length, a number of key-value (KV) pairs included in the respective SSTable file and an SSTable file status.

Example 41

This example includes the elements according to any one of examples 36 to 39, wherein the storage device controller comprises a sort-merge circuitry comprising at least one key-value compaction architecture.

Example 42

This example includes the elements according to any one of examples 36 to 39, wherein the sort-merge command includes a command identifier field.

Example 43

This example includes the elements of example 42, wherein the sort-merge command further includes a field to indicate a number of SSTable files in level N+1 overlapped by the level N SSTable file.

Example 44

According to this example, there is provided a system. The system includes at least one device arranged to perform the method according to any one of examples 10 to 17.

Example 45

According to this example, there is provided a device. The device includes means to perform the method according to any one of examples 10 to 17.

Example 46

According to this example, there is provided a computer readable storage device. The device has stored thereon instructions that when executed by one or more processors result in the following operations including: the method according to any one of examples 10 to 17.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:
1. A storage device comprising:
a storage I/O (input/output) logic to couple the storage device to a host device, the storage I/O logic to receive a sort-merge command the host device; and
a storage device controller to identify a level N SSTable (sorted string table) file, a corresponding level N index file, a first level N+1 SSTable file and a corresponding first level N+1 index file, in response to the sort-merge command to be received from the host device; and to perform a sort-merge of the level N SSTable file and the first level N+1 SSTable file to produce a first level N+1 output SSTable file and a first level N+1 output SSTable index file, wherein the first level N+1 output SSTable file replaces the N SSTable file or replaces the first level N+1 SSTable file, the level N SSTable file comprising at least one level N key-value (KV) pair, the level N+1 SSTable file comprising at least one level N+1 key-value (KV) pair, the sort-merge command comprising a level N SSTable file index, a value corresponding to a number of SSTable files included in level N+1 and a level N+1 start SSTable file index, the identifying based, at least in part, on the level N SSTable file index and the level N+1 start SSTable file index.

2. The storage device of claim 1, wherein the storage device controller is to identify a second level N+1 SSTable file and a corresponding second level N+1 index file based, at least in part, on the level N+1 start SSTable file index, and the storage device controller is to perform a sort-merge of the level N SSTable file and the second level N+1 SSTable file to produce a second level N+1 output SSTable file and a second level N+1 output SSTable index file.

3. The storage device of claim 1, wherein the storage device controller is to at least one of access and/or update an indirection table, the indirection table comprising an array of SSTable file information array elements, each array element corresponding to a respective SSTable file.

4. The storage device of claim 1, wherein performing the sort-merge comprises comparing a level N key from the level N key-value pair to a level N+1 key from the level N+1 key-value pair and selecting the level N key-value pair if the level N key is less than or equal to the level N+1 key or selecting the level N+1 key-value pair if the level N key is greater than the level N+1 key.

5. The storage device of claim 3, wherein each array element comprises an SSTable file index, an SSTable file start logical block address (LBA), an SSTable file LBA length, an SSTable index file start LBA, an SSTable index file LBA length, a number of key-value (KV) pairs included in the respective SSTable file and an SSTable file status.

6. The storage device of claim 1, wherein the storage device controller comprises a sort-merge circuitry comprising at least one key-value compaction architecture.

7. The storage device of claim 1, wherein the sort-merge command comprises at least one of a command identifier field and/or a field to indicate a number of SSTable files in level N+1 overlapped by the level N SSTable file.

8. A method comprising:
coupling, by a storage I/O (input/output) logic, a storage device to a host device, the storage I/O logic to receive a sort-merge command the host device;
identifying, by a storage device controller, a level N SSTable (sorted string table) file, a corresponding level N index file, a first level N+1 SSTable file and a corresponding first level N+1 index file, in response to the sort-merge command to be received from the host device; and
performing, by the storage device controller, a sort-merge of the level N SSTable file and the first level N+1 SSTable file to produce a first level N+1 output SSTable file and a first level N+1 output SSTable index file, wherein the first level N+1 output SSTable file replaces the N SSTable file or replaces the first level N+1 SSTable file, the level N SSTable file comprising at least one level N key-value (KV) pair, the level N+1 SSTable file comprising at least one level N+1 key-value (KV) pair, the sort-merge command comprising a level N SSTable file index, a value corresponding to a number of SSTable files included in level N+1 and a level N+1 start SSTable file index, the identifying based, at least in part, on the level N SSTable file index and the level N+1 start SSTable file index.

9. The method of claim 8, further comprising identifying, by the storage device controller, a second level N+1 SSTable file and a corresponding second level N+1 index file based, at least in part, on the level N+1 start SSTable file index, and performing, by the sort-merge circuitry, a sort-merge of the level N SSTable file and the second level N+1 SSTable file to produce a second level N+1 output SSTable file and a second level N+1 output SSTable index file.

10. The method of claim 8, further comprising at least one of accessing and/or updating, by the storage device controller, an indirection table, the indirection table comprising an array of SSTable file information array elements, each array element corresponding to a respective SSTable file.

11. The method of claim 8, wherein performing the sort-merge comprises comparing a level N key from the level N key-value pair to a level N+1 key from the level N+1 key-value pair and selecting the level N key-value pair if the level N key is less than or equal to the level N+1 key or selecting the level N+1 key-value pair if the level N key is greater than the level N+1 key.

12. The method of claim 10, wherein each array element comprises an SSTable file index, an SSTable file start logical block address (LBA), an SSTable file LBA length, an SSTable index file start LBA, an SSTable index file LBA length, a number of key-value (KV) pairs included in the respective SSTable file and an SSTable file status.

13. The method of claim 8, wherein the storage device controller comprises a sort-merge circuitry comprising at least one key-value compaction architecture.

14. The method of claim 8, wherein the sort-merge command comprises at least one of a command identifier field and/or a field to indicate a number of SSTable files in level N+1 overlapped by the level N SSTable file.

15. A system comprising a storage device comprising:
a plurality of nonvolatile media;
a storage I/O (input/output) logic to couple the storage device to a host device, the storage I/O logic to receive a sort-merge command the host device; and
a storage device controller to identify a level N SSTable (sorted string table) file, a corresponding level N index file, a first level N+1 SSTable file and a corresponding first level N+1 index file, in response to the sort-merge command to be received from the host device; and to perform a sort-merge of the level N SSTable file and the first level N+1 SSTable file to produce a first level N+1 output SSTable file and a first level N+1 output SSTable index file, wherein the first level N+1 output SSTable file replaces the N SSTable file or replaces the first level N+1 SSTable file, the level N SSTable file comprising at least one level N key-value (KV) pair, the level N+1 SSTable file comprising at least one level N+1 key-value (KV) pair, the sort-merge command comprising a level N SSTable file index, a value corresponding to a number of SSTable files included in level N+1 and a level N+1 start SSTable file index, the identifying based, at least in part, on the level N SSTable file index and the level N+1 start SSTable file index.

16. The system of claim 15, wherein the storage device controller is to identify a second level N+1 SSTable file and a corresponding second level N+1 index file based, at least in part, on the level N+1 start SSTable file index, and the storage device controller is to perform a sort-merge of the level N SSTable file and the second level N+1 SSTable file to produce a second level N+1 output SSTable file and a second level N+1 output SSTable index file.

17. The system of claim 15, wherein the storage device controller is to at least one of access and/or update an indirection table, the indirection table comprising an array of SSTable file information array elements, each array element corresponding to a respective SSTable file.

18. The system of claim 15, wherein performing the sort-merge comprises comparing a level N key from the level N key-value pair to a level N+1 key from the level N+1 key-value pair and selecting the level N key-value pair if the level N key is less than or equal to the level N+1 key or selecting the level N+1 key-value pair if the level N key is greater than the level N+1 key.

19. The system of claim 17, wherein each array element comprises an SSTable file index, an SSTable file start logical block address (LBA), an SSTable file LBA length, an SSTable index file start LBA, an SSTable index file LBA length, a number of key-value (KV) pairs included in the respective SSTable file and an SSTable file status.

20. The system of claim 15, wherein the storage device controller comprises a sort-merge circuitry comprising at least one key-value compaction architecture.

21. The system of claim 15, wherein the sort-merge command comprises at least one of a command identifier field and/or a field to indicate a number of SSTable files in level N+1 overlapped by the level N SSTable file.

22. The system of claim 15, wherein the storage device controller comprises a sort-merge circuitry comprising a command buffer to store the sort-merge command, a plurality of input buffers to store selected SS table files and selected SS table file indexes, a comparator to compare selected keys, a multiplexer, a plurality of intermediate buffers and an output buffer to store each level N+1 output SSTable file.

23. The system of claim 15, wherein the storage device is selected from the group comprising a solid-state drive (SSD), a hard disk drive (HDD), a network attached storage (NAS) system, a storage area network (SAN) and/or a redundant array of independent disks (RAID) system.

24. The system of claim 15, wherein each of the plurality of nonvolatile media is selected from the group comprising a NAND flash memory, a NOR memory, a solid state memory, byte addressable nonvolatile memory devices, ferroelectric memory, silicon-oxide-nitride-oxide-silicon (SONOS) memory, polymer memory, byte addressable random accessible three dimensional crosspoint memory, ferroelectric transistor random access memory, magnetoresistive random access memory, phase change memory, resistive memory, ferroelectric memory, spin-transfer torque memory, thermal assisted switching memory (TAS), millipede memory, floating junction gate memory (FJG RAM), magnetic tunnel junction (MTJ) memory, electrochemical cells (ECM) memory, binary oxide filament cell memory, interfacial switching memory, battery-backed RAM, ovonic memory, nanowire memory and/or electrically erasable programmable read-only memory (EEPROM).

* * * * *